(12) United States Patent
Cheng et al.

(10) Patent No.: US 8,931,895 B2
(45) Date of Patent: Jan. 13, 2015

(54) ADJUSTABLE EYEGLASSES CORD

(71) Applicants: Yung-Ching Cheng, Tainan (TW);
Yung-Ming Cheng, Tainan (TW)

(72) Inventors: Yung-Ching Cheng, Tainan (TW);
Yung-Ming Cheng, Tainan (TW)

( * ) Notice: Subject to any disclaimer, the term of this patent is extended or adjusted under 35 U.S.C. 154(b) by 42 days.

(21) Appl. No.: 13/912,467

(22) Filed: Jun. 7, 2013

(65) Prior Publication Data

US 2014/0362337 A1 Dec. 11, 2014

(51) Int. Cl.
*G02C 3/00* (2006.01)

(52) U.S. Cl.
CPC ..................... *G02C 3/003* (2013.01)
USPC ........................... 351/156; 351/157; D16/339

(58) Field of Classification Search
USPC ......... 351/156, 157, 158, 41; 2/452; D16/339
See application file for complete search history.

(56) References Cited

U.S. PATENT DOCUMENTS

| | | | | |
|---|---|---|---|---|
| 2,704,961 | A | * | 3/1955 | Weil .............................. 351/157 |
| 6,644,808 | B1 | * | 11/2003 | Liu ................................ 351/156 |
| 7,467,867 | B1 | | 12/2008 | Williams |
| 2012/0307199 | A1 | * | 12/2012 | Krisik et al. .................. 351/157 |

FOREIGN PATENT DOCUMENTS

TW          M385707 U1     8/2010

* cited by examiner

*Primary Examiner* — Hung Dang
(74) *Attorney, Agent, or Firm* — Rosenberg, Klein & Lee

(57) ABSTRACT

An adjustable eyeglasses cord structure is provided, which mainly comprises two temple sleeves, two spherical plugs, two retaining buckles and a cord. The open end of each temple sleeve has an accommodation space for receiving the temple and the tail end has a spherical chamber corresponding to the spherical plug. Both ends of the cord are inserted and fixed in the retaining buckles which are then disposed within the spherical plugs. Each spherical plug is disposed in the spherical chamber of the temple sleeve. A slot is provided in the spherical chamber for the cord to pass through. In this manner, a cord having stiffness can be deflected to adjust an angle adaptable to use. Temple sleeve with flexibility can facilitate the in-out of the spherical plug so as to enable the function of adjusting the cord angle and the convenience for both assembly and disassembly.

7 Claims, 6 Drawing Sheets

ADJUSTABLE EYEGLASSES CORD

BACKGROUND OF THE INVENTION

1. Field of the Invention

The present invention relates to an adjustable eyeglasses cord structure, more particularly to an adjustable eyeglasses cord structure enabling adjustment of the cord angle, in which the adjustment is achieved by a ball valve shape member.

2. Brief Description of Prior Arts

Generally, eyeglasses has been becoming an indispensable item in our daily live. Besides vision correction, eyeglasses also plays the roles of sun shading, aesthetic and eyes protection. However, wearing eyeglasses for a long time often suffers some inconvenience. For example, there might be the cases of falling-off of the eyeglasses in walking, working, or exercising; or of damaging by press or collision when eyeglasses are taken off. Thus, relevant industries have proposed to provide an eyeglasses cord which is to be provided between the temples for hanging on the neck. In this way, even the eyeglasses is carelessly detached from wearing in working, walking or exercising, it can be prevented from dropping down to ground effectively by the eyeglasses cord which is tied to the temples and hung on user's neck. When a user wants to take off the eyeglasses and to take a recess for his eyes, the eyeglasses is hung on user's neck by the cord, and user need not to worry the case of damage due to carelessly dropping down to ground or pressing due to improperly located.

Conventional eyeglasses cord structure usually has flexible fitting portions provided on both ends, each flexible fitting portion being provided with a metal ring body which is provided for preventing the temples from coming off the fitting portion. In implementation, the temple is simply fitted into a hole in each flexible fitting portion to accomplish the setting, and the eyeglasses cord is then hung on user's neck.

Referring to a Taiwanese Patent Pub. No. M385707 entitled "Improvement on Eyeglasses Cord Structure", which is mainly formed by an eyeglasses and a hanging cord. A hanging hole is provided on the front segment of each temple. The hanging cord has locating members provided on both ends thereof, one end of each locating member has a fitting portion to be integrally combined with the hanging cord and the other end is provided with a clamping portion with elastic force. The clamping portions of the locating members are combined with the hanging holes on the temples so that users can hang the eyeglasses on their neck conveniently.

The abovementioned eyeglasses cords can facilitate wearing of eyeglasses for users, but there are yet rooms for further improvement.

1. The eyeglasses cord is ordinarily a flexible cord, it is unable to adjust the cord angle according to user's need.
2. The metal ring body of the fitting portion can render damage to the temples of eyeglasses, making the temples scratching or destroying the hanging holes of the temples first.
3. Assembly and disassembly are inconvenient.

Further, an U.S. Pat. No. 7,467,867 B1 is disclosed as shown in FIG. 6, which is a retention tube (6) having a through hole (61) thereon. One end of the through hole (61) is an aperture the diameter of which is able to pass over the temple (7), and the other end of the through hole (61) is an opening the diameter of which is able to pass over the steel cord (8). The through hole (61) has a bead (62) provided therein and the bead (62) has a through aperture (621) for the passing over of the steel cord (8). The end of the steel cord (8) is locked by a metal retainer (81) so that the steel cord (8) does not come off the through aperture (621). This structure has the following disadvantages found in its implementation.

1. As the through hole of the retention tube corresponding to the end of the steel cord is shrunk to a diameter equivalent to that of the steel cord, just like to overlay the steel cord, the steel cord is only used with a single angle after fitted with the temple, so that the steel cord is unable to be adjusted to a suitable cord angle different for each individual.
2. The steel cord has stiffness, so the steel cord will displace forward when it is in using, and this will cause scratch of temple by the metal retainer.

In view of the above reasons, the inventor of the present invention hereby proposes an adjustable eyeglasses cord structure according to his long-term abundant experience in development and manufacturing activities in relevant fields, and based on the effort conducted on the conventional structure with constantly improving principle, so as to achieve better implementation value.

SUMMARY OF THE INVENTION

The main object of this invention is to provide an adjustable eyeglasses cord structure enabling adjustment of the cord angle, in which the adjustment is achieved by a ball valve shape member.

The above object and effect are achieved by the following specific technical means.

The adjustable eyeglasses cord structure of the present invention mainly comprises two temple sleeves, two spherical plugs, two retaining buckles and a cord. The open end of each temple sleeve has an accommodation space for receiving the temple and the tail end has a spherical chamber corresponding to the spherical plug. Both ends of the cord are inserted and fixed in the retaining buckles which are then disposed within the spherical plugs. Each spherical plug is disposed in the spherical chamber of the temple sleeve. A slot is provided in the spherical chamber for the cord to pass through. In this manner, a cord having stiffness can be deflected to be adjusted to an angle adaptable to user's need. Temple sleeve with flexibility can facilitate the in-out of the spherical plug so as to enable the function of adjusting the cord angle and the convenience for both assembly and disassembly.

According to the above adjustable eyeglasses cord structure, each spherical plug has a cavity, and the opening of the cavity has a ring shape protrusion provided at the ring edge thereof so that the retaining buckle for fixing the cord can be received within the cavity and is stopped by the protrusion without coming off the cavity, and simultaneously the retaining buckle is limited therein to prevent it from scratching the temple.

According to the above adjustable eyeglasses cord structure, the temple sleeve is made by flexible material such as silicone rubber or neoprene.

According to the above adjustable eyeglasses cord, the cord is a resilient cord. And the cord can employ PVC cord, PVC+steel cord, nylon cord, carbon fiber cord, bamboo carbon cord.

BRIEF DESCRIPTION OF ACCOMPANYING DRAWINGS

The present invention will be better understood by the detailed description of a preferred embodiment with reference to the accompanied drawings, in which.

DETAILED DESCRIPTION OF PREFERRED EMBODIMENTS

The technical contents, objects and effect of the present invention will become more apparent by the detailed description in conjunction with the accompanied drawings.

Figure 1:
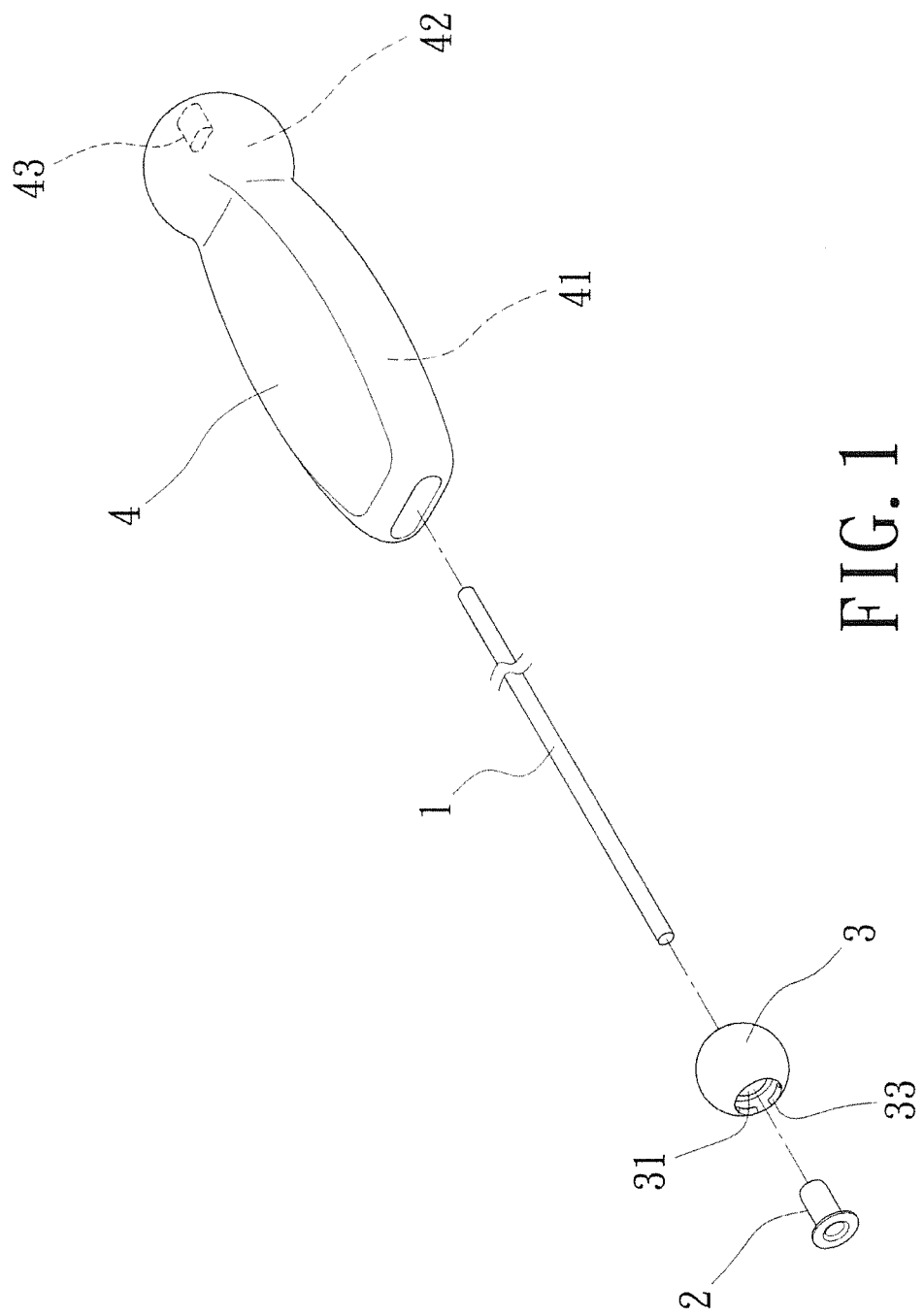
FIG. 1 is a perspective schematic exploded view of the present invention.
Figure 2:
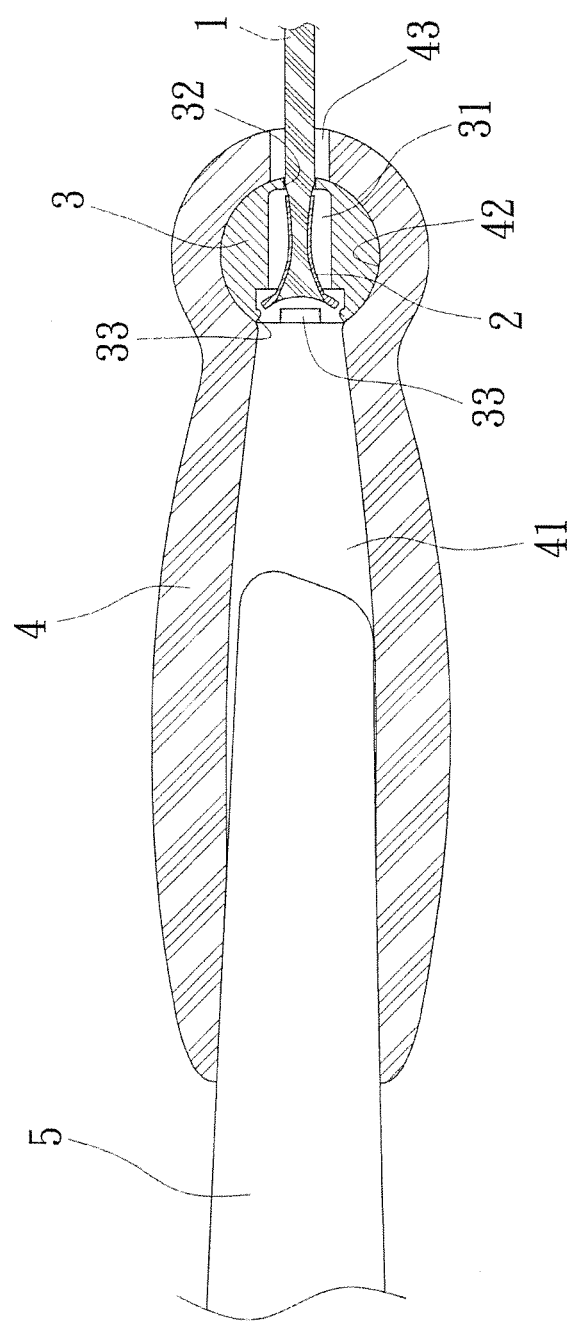
FIG. 2 is a schematic sectional view of the present invention.
Figure 3:
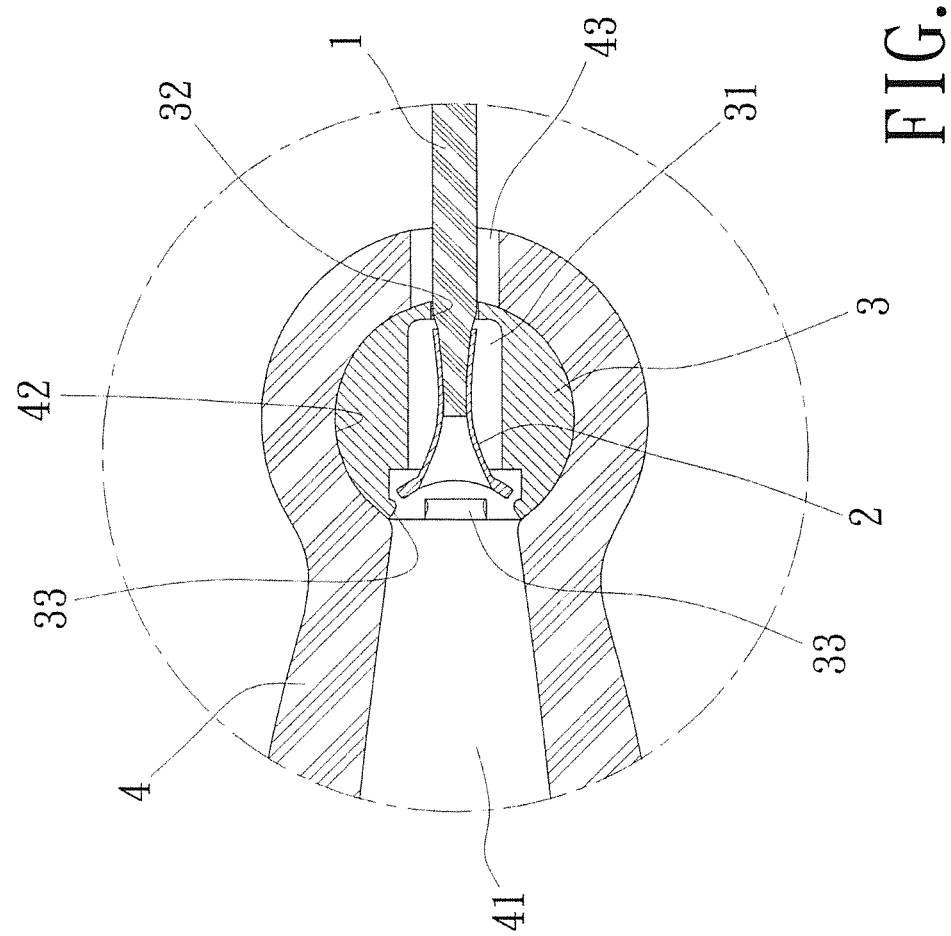
FIG. 3 is a partially enlarged sectional view of the present invention.
Figure 4:
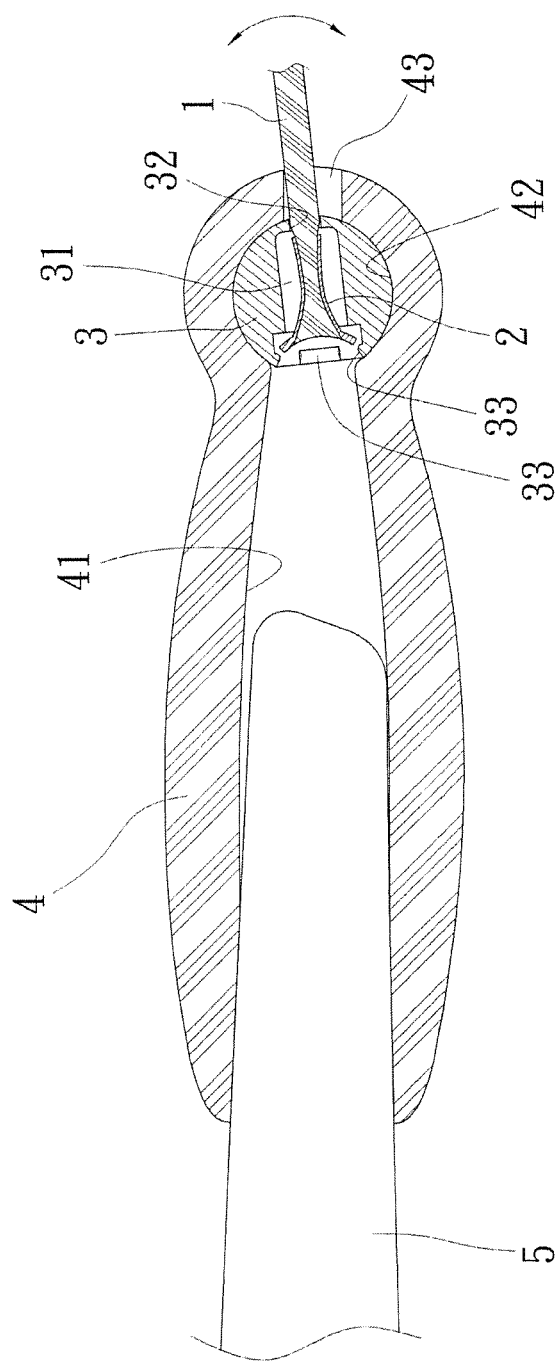
FIG. 4 is a schematic sectional view showing the angle adjustment of the present invention.
Figure 5:
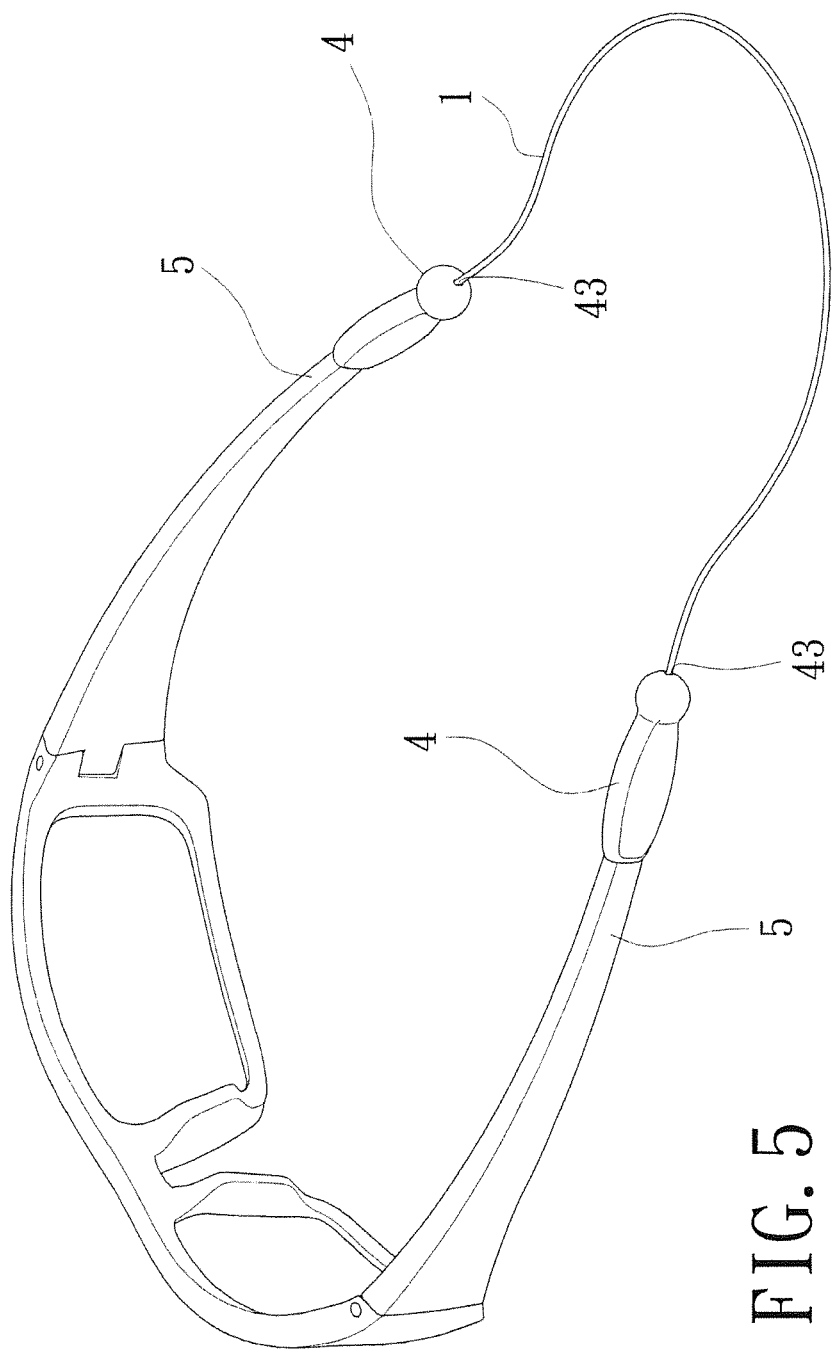
FIG. 5 is a perspective view of usage and assembly of the present invention.
Figure 6:
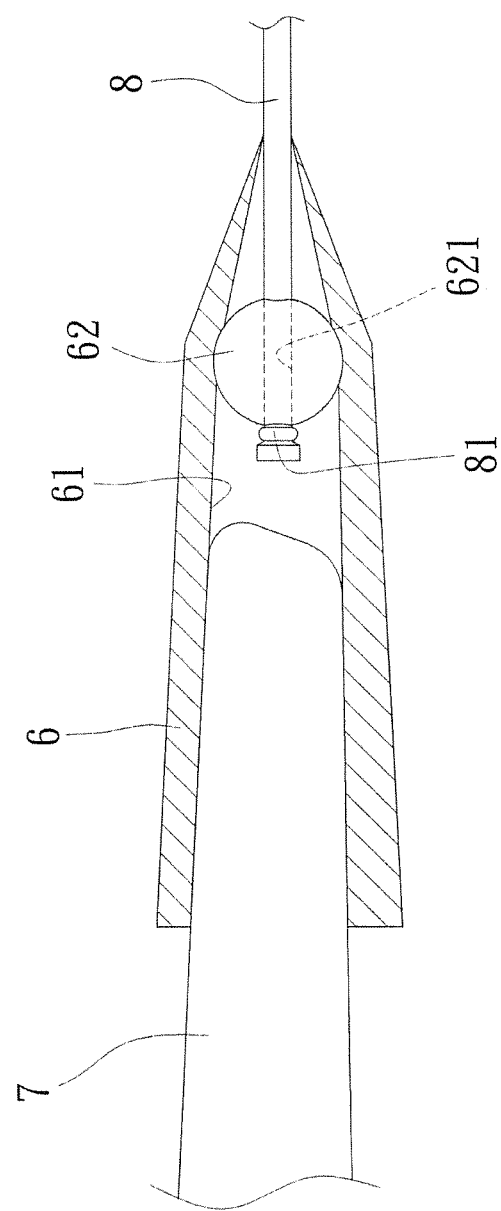
FIG. 6 is a schematic sectional view of a prior art.

FIG. 1 is a perspective view of the appearance of the adjustable eyeglasses cord of the present invention, and FIG. 2 is a schematic view of the structure of the adjustable eyeglasses cord of the present invention. As shown in the figures, the adjustable eyeglasses cord mainly comprises:

a cord (1) which is a material having stiffness;

two retaining buckles (2) corresponding to both ends of the cord (1) for fixing the cord (1);

two spherical plugs (3) having cavities (31) respectively in the interiors thereof for accommodation of the retaining buckles (2), the cavities (31) having through holes (32) respectively for passing over the cord (1), the openings of the cavities (31) having ring shape protrusions (33) provided at the ring edges thereof so that the retaining buckles (2) are limited by the protrusion (33);

two temple sleeves (4) made by flexible material with elasticity, the open ends of the temple sleeves (4) respectively have accommodation spaces (41) for receiving the temples (5) and the tail ends respectively having spherical chambers (42) for receiving the spherical plugs (3), the spherical chambers (42) having slots (43) provided for the cord (1) to pass through.

In assembling, both ends of the cord (1) are sequentially passed through the through holes (32) of the spherical plugs (3) and the retaining buckles (2) respectively, and the retaining buckles (2) are pressed and thus fixed at both ends of the cord (1), and then the retaining buckles (2) fixed with the cord (1) are disposed respectively in the cavities (31) of the spherical plugs (3) in such a manner that the retaining buckles (2) are limited by the protrusions (33) on the ring edges of the openings of the cavities (31). Next, the spherical plugs (3) are respectively placed into the corresponding temple sleeves (4). As the temple sleeves (4) are made of flexible material, the cord (1) can be fitted in the temple sleeves (4) at the beginning of assembly.

When in use, the temples (5) are correspondingly inserted into the accommodation spaces (41) from the opening ends of the temple sleeves (4) respectively so as to allow the eyeglasses cord structure and the eyeglasses combined together. As the temples (5) made by manufacturers have different design and cord angles such as deflecting upward, deflecting downward or having curvature, the cord (1) may directly contact with the neck of user and cause uncomfortableness of user after the temples (5) have been inserted into the accommodation spaces (41) of the temple sleeves (4). Thus, user can adjust the angle of the cord (1) in up-down direction by the provision of the slots (43) of the temple sleeves (4). As the cord (1) has stiffness and thus is not a soft cord, the cord (1) can cooperate with the slots (43) to control the cord angle adjustment. The cord (1) further can employ PVC cord, PVC+steel cord, nylon cord, carbon fiber cord, bamboo carbon cord. When conducting cord angle adjustment, the spherical plug (3) can swivel in the spherical chamber (42) along with the displacement angle of the cord (1) at the slot (43).

As the temple sleeve (4) is made of elastic and flexible material, when the cord (1) is carelessly entangled with machine tool in working, the cord (1) is pulled by external force and the spherical plug (3) will flare the slot (43) so as to be ejected out from the slot (43) at once. The immediate detachment of the spherical plug (3) from the temple sleeve (4) can prevent user from wounded by the entanglement of the cord with the machine tool. Later, the ejected out spherical plug (3) can be inserted into the spherical chamber (42) of the temple sleeve (4) through the slot (43).

LOGO indications can be further marked on the outside surfaces of the temple sleeve (4).

While the present invention has been described by preferred embodiments in conjunction with accompanying drawings, it should be understood the embodiments and the drawings are merely for descriptive and illustrative purpose, not intended for restriction of the scope of the present invention. Equivalent variations and modifications conducted by person skilled in the art without departing from the spirit and scope of the present invention should be considered to be still within the scope of the present invention.

Based on the foregoing description of the constitution and implementation, the present invention has following advantages when comparing with conventional structure.

1. The adjustable eyeglasses cord structure of the present invention can achieve the expected function of adjusting the cord angle adaptable to user by the provision of the slot of the temple sleeve.
2. The adjustable eyeglasses cord structure of the present invention is to receive the retaining buckle for fixing the cord within the cavity and simultaneously to limit the retaining buckle by the protrusion without coming off. Therefore, the retaining buckle will not scratch the temple.
3. The adjustable eyeglasses cord structure of the present invention can achieve the functions of easy-assembly and easy-disassembly by providing flexible temple sleeve which is easy for the in-out of the spherical plug.
4. The adjustable eyeglasses cord structure of the present invention can allow the spherical plug to detach from the temple sleeve immediately when the cord is pulled by external force. Therefore, the design of the present invention is able to provide high safety to protect users.

What is claimed is:

1. An adjustable eyeglasses cord structure, mainly comprises:

a cord which is made by a material having stiffness;

two retaining buckles corresponding to both ends of said cord for fixing said cord;

two spherical plugs having cavities respectively in the interiors thereof for accommodation of said retaining buckles, said cavities having through holes respectively for the passing-over of said cord, the openings of the cavities having ring shape protrusions provided at the ring edges thereof so that said retaining buckles are limited by the protrusion;

two temple sleeves made by flexible material with elasticity, the open ends of said temple sleeves respectively have accommodation spaces for receiving temples and the tail ends respectively having spherical chambers for receiving said spherical plugs, said spherical chambers having slots respectively provided for said cord to pass through.

2. The adjustable eyeglasses cord structure as claimed in claim 1, wherein said temple sleeves are made of silicone rubber or neoprene.

3. The adjustable eyeglasses cord structure as claimed in claim 2, wherein said cord employs PVC cord, PVC+steel cord, nylon cord, carbon fiber cord, bamboo carbon cord.

4. The adjustable eyeglasses cord structure as claimed in claim 2, wherein said temple sleeve further has LOGO indications provided on its outside surfaces.

5. The adjustable eyeglasses cord structure as claimed in claim 1, wherein said cord employs PVC cord, PVC+steel cord, nylon cord, carbon fiber cord, and bamboo carbon cord.

6. The adjustable eyeglasses cord structure as claimed in claim 5, wherein said temple sleeve further has LOGO indications provided on its outside surfaces.

7. The adjustable eyeglasses cord structure as claimed in claim 1, wherein said temple sleeve further has LOGO indications provided on its outside surfaces.

\* \* \* \* \*